C. H. STANTON.
TYPE-WRITER.

No. 191,382. Patented May 29, 1877.

WITNESSES:
Jas. E. Hutchinson
H. C. Hazard

INVENTOR:
Chas. H. Stanton, by
Prindle & Co. his Attys.

UNITED STATES PATENT OFFICE.

CHARLES H. STANTON, OF NORWICH, NEW YORK.

IMPROVEMENT IN TYPE-WRITERS.

Specification forming part of Letters Patent No. 191,382, dated May 29, 1877; application filed December 8, 1876.

*To all whom it may concern:*

Be it known that I, CHARLES H. STANTON, of Norwich, in the county of Chenango and in the State of New York, have invented certain new and useful Improvements in Supplemental Gages for Type-Writing Machines; and do hereby declare that the following is a full, clear, and exact description thereof, reference being had to the accompanying drawing, making a part of this specification, in which—

Figure 1:
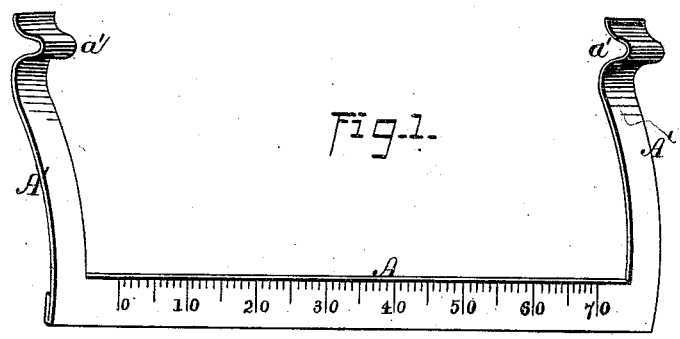
Figure 2:
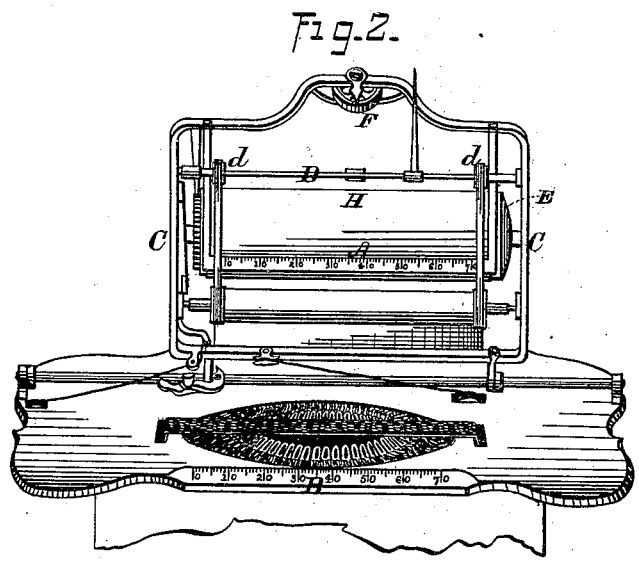

Figure 1 is a perspective view of my gage detached from a machine, and Fig. 2 is a like view of a machine having attached thereto said gage.

Letters of like name and kind refer to like parts in each of the figures.

In the use of type-writers, more especially the machine known as the "Sholes and Glidden," much difficulty is experienced in adjusting the paper so as to enable printing to be done at any desired point, it being necessary to measure the distance from the left-hand edge of the sheet being printed, and then move the carriage until the pointer indicates the correct position upon the scale.

The adjustment named is especially necessary in the reprinting of letters which have been erased, it being important that perfect accuracy should be obtainable in such instances.

To insure the perfect and easy adjustment of paper so to enable printing to be done at any desired point is the design of my invention, which consists in a supplemental gage, which corresponds in length and in divisions with the fixed gage of a type-writer, and is arranged near the paper, in close proximity to the line to be printed upon, substantially as and for the purpose hereinafter specified.

In the employment of my gage any desired means may be used for attaching the same to or upon the carriage, but the construction hereinafter described is preferred.

In the annexed drawing, A represents my gage, which corresponds in length and in divisions to the fixed gage B of a type-writer, and at each of its ends is provided with an arm, A', that has a line at a right angle to said gage, and is bent in the form shown in Fig. 1.

The gage A, as described, is attached to the movable carriage of a type-writer by engaging the hooked ends $a'$ of its arms A' with the upper portion of the frame C of said carriage, replacing the pulley rod or shaft D (which had first been removed) with the band-pulleys $d$, upon the inner side of each arm, when it will be found that said gage A will bear lightly against the rubber impression-roller E, just below the line operated upon by the type.

The gage A is now adjusted lengthwise until it exactly coincides in position with the fixed gage B, when it will be found that if the carriage be moved laterally until the indicator F points to any given number upon said fixed gage, by striking one of the keys G the letter connected therewith will be printed upon the paper H at a correspondingly-numbered point upon said gage A.

By reversing the order and ascertaining by the gage A the point upon the paper at which it is required to commence printing, and then adjusting the carriage until the indicator F points to a corresponding number upon the fixed gage B, upon striking the keys it will be found that the type will impinge upon the paper at the point desired.

To enable the paper H to be adjusted lengthwise so as to enable printing to be commenced at any given point, the gage should be arranged at a given distance above or below the line where the type impinges upon said paper, when, by moving the latter until the line to be printed upon occupies the required position with relation to said gage, the adjustment will be perfect.

My device thus permits the ready and perfect adjustment of the paper in both directions so as to enable printing to be commenced upon any line and any given point of such line.

If desired, my gage may be constructed with two scales, one above and the other below the line of printing, and it may be attached to any portion of the movable carriage or to its operative parts, the only requisite being that said gage shall occupy the hereinbefore-described position with relation to the point at which the type impinge upon the impression-roller.

Having thus fully set forth the nature and merits of my invention, what I claim as new is—

As an improvement in type-writers, a supplemental gage, which corresponds in length and in divisions with the fixed gage, is connected to or with the movable carriage, and is arranged near the paper in close proximity to the line to be printed upon, substantially as and for the purpose specified.

In testimony that I claim the foregoing I have hereunto set my hand this 4th day of December, 1876.

CHARLES H. STANTON.

Witnesses:
R. A. STANTON,
D. M. HOLMES.